United States Patent
Lin et al.

(10) Patent No.: US 8,372,902 B2
(45) Date of Patent: Feb. 12, 2013

(54) NON-DRIPPING FLAME RETARDING MASTERBATCH, COMPOSITION AND PROCESS FOR PREPARING THE SAME AND FLAME RETARDING ARTICLE CONTAINING THE SAME

(75) Inventors: Sheng-Jen Lin, Taoyuan (TW); Wei-Ming Chen, Tu-Chen (TW); Nai-Yun Liang, Taipei (TW); Wei-Peng Lin, Sijhih (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 178 days.

(21) Appl. No.: 12/648,083

(22) Filed: Dec. 28, 2009

(65) Prior Publication Data
US 2011/0098391 A1    Apr. 28, 2011

(30) Foreign Application Priority Data
Oct. 28, 2009 (TW) .............................. 98136535 A

(51) Int. Cl.
*C08G 18/77* (2006.01)
(52) U.S. Cl. ............. 524/115; 522/76; 524/140; 264/13
(58) Field of Classification Search .................... 524/115
See application file for complete search history.

(56) References Cited

U.S. PATENT DOCUMENTS

| | | | | |
|---|---|---|---|---|
| 4,059,650 A * | 11/1977 | Slama et al. | .................. | 523/460 |
| 4,165,309 A * | 8/1979 | Fielding et al. | ............... | 524/112 |
| 4,254,011 A * | 3/1981 | Bier | ................................ | 524/513 |
| 4,256,558 A * | 3/1981 | Inata et al. | ....................... | 522/78 |
| 4,415,696 A * | 11/1983 | Mark | ............................. | 524/490 |
| 5,019,630 A * | 5/1991 | Chida et al. | ................ | 525/326.2 |
| 6,555,624 B2 * | 4/2003 | Nishihara et al. | ............. | 525/191 |
| 2004/0266301 A1* | 12/2004 | Vedula et al. | ................. | 442/327 |
| 2006/0102882 A1* | 5/2006 | Bedner et al. | ................. | 252/601 |

* cited by examiner

*Primary Examiner* — Doris Lee
(74) *Attorney, Agent, or Firm* — McClure, Qualey & Rodack, LLP

(57) ABSTRACT

Disclosed herein is a composition for preparing a non-dripping flame retarding masterbatch. The flame retarding masterbatch includes a fire retardant in an amount of about 0.1-15.0 wt %, a crosslinking agent in an amount of about 0.1-1.5 wt %, a thermoplastic polymer in an amount of about 76.5-99.5 wt %, a crosslinking initiator in an amount of about 0.01-2.0 wt %, and a dispersing agent in an amount of about 0.1-5.0 wt % in the composition.

7 Claims, 2 Drawing Sheets

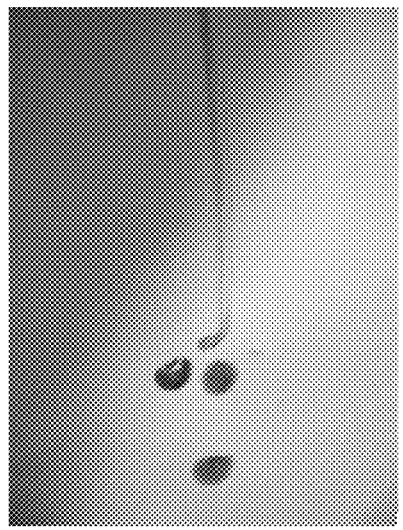
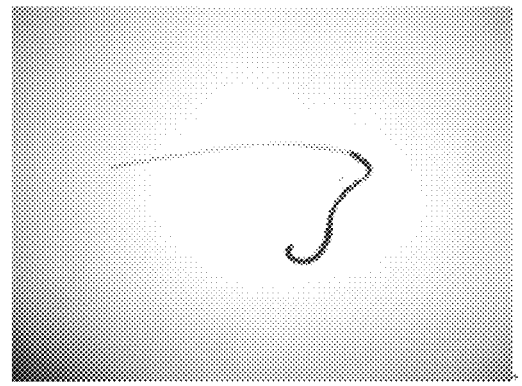
FIG. 1A  FIG. 1B
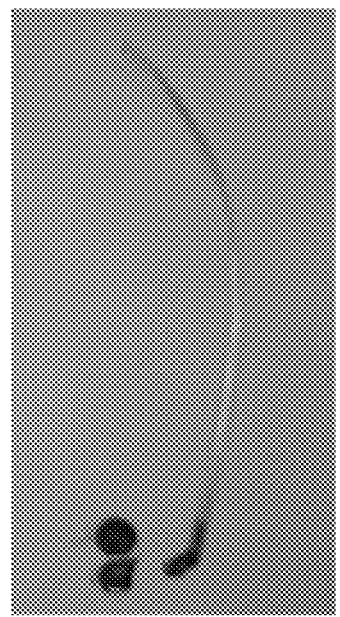
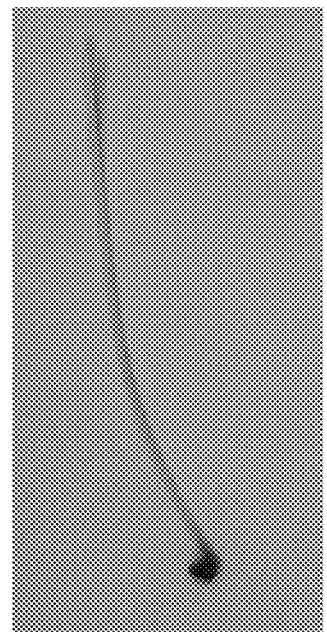
FIG. 2A  FIG. 2B

NON-DRIPPING FLAME RETARDING MASTERBATCH, COMPOSITION AND PROCESS FOR PREPARING THE SAME AND FLAME RETARDING ARTICLE CONTAINING THE SAME

RELATED APPLICATIONS

This application claims priority to Taiwan application no. 98136535, filed Oct. 28, 2009, the entirety of which is incorporated herein by reference.

BACKGROUND

1. Field of Invention

The present disclosure relates to flame retarding materials. More particularly, the present disclosure relates to non-dripping flame retarding materials.

2. Description of Related Art

Flame retardants are widely used in plastic and textile materials so as to bestow combustion-inhibiting or flame-resistant properties to the final products. Depending on the principal component, flame retardants can be categorized into halogenated flame retardants, phosphorus-containing flame retardants, phosphorus and nitrogen containing flame retardants and inorganic flame retardants.

The principal component of the halogenated flame retardants is halocarbon such as polychlorinated biphenyl, chlorinated paraffin, polybrominated biphenyl, and polybromophenyl ether. Halogenated flame retardants are known to exhibit good flame-retarding efficacy and are highly compatible with plastic materials. Moreover, the halogenated flame retardants would not significantly affect the inherent properties of the plastic materials, and thus would not jeopardize the mechanical properties of the final products. Therefore, halogenated flame retardants are widely used in various plastic and textile products in the early days. During combustion, however, the halogenated flame retardants may produce black smokes that are sometimes corrosive; more particularly, some halogenated flame retardants may produce carcinogenic substances. In view of the safety concerns to the environment and human health, most halogenated flame retardants are banned for use in textile products, with only a small portion of halogenated flame retardants are allowed in plastic materials.

Common examples of phosphorus-containing flame retardants may include, but are not limited to red phosphorus, polyphosphate and ammonium polyphosphate. The phosphorus content of the red phosphorus may be up to 100%, and hence, theoretically, red phosphorus should be the most effective one among all the phosphorus-containing flame retardants. However, the appearance of the red phosphorus is usually black or red which together with its poor compatibility with plastic materials and poor processability limit its application in the plastic and textile fields. On the other hand, polyphosphate and ammonium polyphosphate are widely used in the textile field as flame retardants. However, in order to exhibit satisfactory fire retarding efficacy, the required content of such fire retardants is as high as 30 wt % which may not only increase the manufacturing cost but also decrease the spinnability of the material. In addition, phosphorus-containing flame retardants may cause dripping effect during combustion.

Phosphorus and nitrogen containing flame retardants, also known as intumescent fire retardants, are halogen-free flame retardants. Examples of intumescent fire retardants are ammonium polyphosphate, melamine (trimeric cyanamide) and pentaerythritol. The phosphorus and nitrogen containing flame retardants would increase the carbon source and acid source and swell upon heating. In addition, they produce less smoke and substantially no toxic gases during burning. However, the processability and weather resistance of the phosphorus and nitrogen containing flame retardants are less satisfactory, and hence, the properties thereof may change under the influences of the weather and environment. Moreover, phosphorus and nitrogen containing flame retardants may be separated from the matrix material, for example, while being damped or hydrolyzed.

Inorganic flame retardants include antimony trioxide, magnesium hydroxide, aluminium hydroxide, and zinc borate. These materials produce less smoke during combustion, and usually release substances such as water and carbon dioxide that are more environmentally friendly. However, the flame retarding efficacy of such inorganic materials is not as desirable as the organic fire retardants. Hence, the inorganic materials should be added in a substantially great amount to bestow a satisfactory flame retarding efficacy to the final product material. Besides, such inorganic materials are poorly compatible with thermoplastic materials such as resins, and hence they tend to aggregate within the thermoplastic materials.

In sum, various problems are experienced while using the flame retardants in the textile field. Such problems are, for example, poor in processability, washing fastness and mechanical properties. Regarding the finished flame retarding textiles, the textiles may not possess desirable transparency. Also, the textiles, during combustion, may not exhibit satisfactory flame retarding efficacy and may cause dripping effect.

In view of the foregoing, there exits an urgent need in the related field to provide a novel flame retarding materials that possess both desirable processing characteristics and flame retarding efficacy.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In one aspect, the present disclosure is directed to a composition for preparing a non-dripping flame retarding masterbatch. The non-dripping flame retarding masterbatch thus-obtained exhibits both flame retarding and non-dripping capabilities. Moreover, the amount of the flame retardant(s) in such composition is less than those contained in the conventional compositions, therefore reducing the production cost and improving the spinnability and other mechanical properties of the masterbatch.

According to one embodiment of the present disclosure, the composition comprises: about 0.1-15.0 wt % flame retardant, about 0.1-1.5 wt % crosslinking agent, about 76.5-99.5 wt % thermoplastic polymer, about 0.01-2.0 wt % crosslinking initiator, and about 0.1-5.0 wt % dispersing agent.

In another aspect, the present disclosure is directed to a method for preparing a non-dripping flame retarding masterbatch. Generally, the composition(s) used to preparing the non-dripping flame retarding masterbatch in accordance with such method may fall within the scope of the composition presented in the above-mentioned aspect/embodiment(s).

According to one embodiment of the present disclosure, the method comprises the steps as follows. About 0.1 to about 15.0 wt % flame retardant, about 0.1 to about 1.5 wt % crosslinking agent, about 76.5 to about 99.5 wt % thermoplastic polymer, and about 0.1 to about 5.0 wt % dispersing agent are admixed to form an admixture. Thereafter, about 0.01 to about 2.0 wt % crosslinking initiator was added into the admixture to form a composition for compounding. The composition is compounded to melt the thermoplastic polymer whereby the melted thermoplastic polymer is crosslinked by the crosslinking agent, and the retarding agent is dispersed in the cross-linked thermoplastic. Generally, the compounding step is performed for about 1-20 minutes, and a compounding temperature is about 220-270° C. Afterwards, the cross-linked thermoplastic having the retarding agent dispersed therein is pelletized to obtain the non-dripping flame retarding masterbatch.

In yet another aspect, the present disclosure is directed to a non-dripping flame retarding material.

According to embodiments of the present disclosure, the non-dripping flame retarding material comprises a crosslinked thermoplastic polymer and a fire retardant dispersed within the thermoplastic polymer, wherein the weight ratio of the crosslinked thermoplastic polymer to the fire retardant is about 5:1 to 996:1. Comparing with conventional flame retarding materials, such non-dripping flame retarding material contains less flame retardant while exhibits adequate flame retarding capability.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIG. 1A is a photo illustrating the after-burnt appearance of a pure nylon material;

FIG. 1B is a photo illustrating the after-burnt appearance of a nylon material according to one example of the present disclosure;

FIG. 2A is a photo illustrating the after-burnt appearance of a pure polyester material;

FIG. 2B is a photo illustrating the after-burnt appearance of a polyester material according to another example of the present disclosure;

DETAILED DESCRIPTION

Figure 3A:
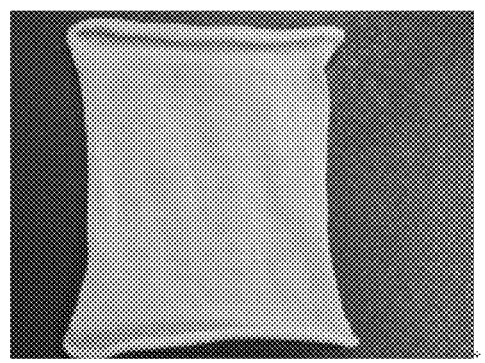
FIG. 3A is photo illustrating a textile obtained by spinning the non-dripping flame retarding masterbatch of one embodiment of the present disclosure.
Figure 3B:
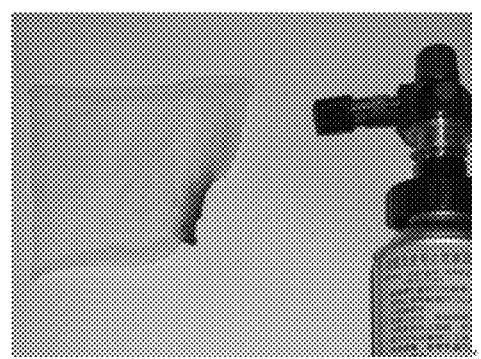
FIG. 3B is a photo illustrating the after-burnt appearance of the fabric of FIG. 3A.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Factors to be taken into account while manufacturing a flame retarding material may include the compatibility between the flame retardant and the thermoplastic material, the effects the flame retardant may impose on the mechanical properties of the thermoplastic material, flame retarding efficacy of the flame retarding material, the processability of the flame retarding material, the price/performance ratio of the flame retarding material, and safety concerns to the environment and human health during the processing and/or burning of the flame retarding material.

In view of the foregoing and other factors, a first aspect of the present disclosure is directed to a composition for preparing a non-dripping flame retarding masterbatch. Generally, the composition for preparing the non-dripping flame retarding masterbatch comprises a flame retardant, a crosslinking agent, a thermoplastic polymer, a crosslinking initiator, and a dispersing agent. Examples and proportions of the aforementioned constituents are provided hereinafter.

According to embodiments of the present disclosure, the composition may employ any suitable flame retardants. However, most halogenated flame retardants may cause negative effects to the environment and human health; hence, a non-limiting example of the flame retardant may be halogen-free flame retardants.

Moreover, phosphorus-containing flame retardants are frequently used flame retarding textiles. Therefore, in one optional embodiment, phosphorus-containing flame retardants may be used. Examples of phosphorus-containing flame retardants include, but are not limited to polyphosphates and ammonium polyphosphates.

Conventional masterbatches usually comprise 20-30 wt % flame retardants, such as phosphorus-containing or other flame retardants, so as to provide the masterbatches and/or the resultant flame retarding textiles with a desirable flame retarding efficacy. Nevertheless, the composition according to embodiments of the present disclosure comprises a flame retardant present in an amount of about 0.1-15 wt %, while the resultant masterbatch may still exhibit an adequate flame retarding efficacy. In some embodiments, the flame retardant is in an amount of about 5-15 wt %. Furthermore, the flame retarding materials of the present disclosure have no observable melt dripping upon exposure to flame.

Specifically, the weight percent of the flame retardant of the total composition may be about 0.1, 0.2, 0.5, 1.0, 1.5, 2.0, 2.5, 3.0, 3.5, 4.0, 4.5, 5.0, 5.5, 6.0, 6.5, 7.0, 7.5, 0, 85, 9., 9.5, 10.0, 10.5, 11.0, 11.5, 12.0, 12.5, 13.0, 13.5, 14.0, 14.5, or 15.0%.

According to optional embodiments of the present disclosure, the flame retardant used may be in a form of micrometer scale powder. Hence, the flame retardant may be more evenly dispersed within the thermoplastic polymer. For example, the diameter of the flame retardant powder may be about 1-10 μm, such as about 1, 2, 3, 4, 5, 6, 7, 8, 9, or 10 μm.

According to embodiments of the present disclosure, the crosslinking agent may be a diallyl compound or a triallyl compound.

Illustrative examples of diallyl compounds include, but are not limited to, diallyl phthalate (DAP), diallyl succinate (DASu), and N,N'-diallyltartramide (DATD).

Illustrative examples of triallyl compounds include, but are not limited to, triallylamine, triacryloylhexahydro-1,3,5-triazine (TAT), triallyl trimesate (TAM), triallyl cyanurate (TAC), triallyl isocynaurate (TAIC), and triallyl-ammoniumcyanurate. For example, TAT is used in an example provided hereinafter.

According to various embodiments of the present invention, the weight percent of the crosslinking agent of the composition for preparing a non-dripping flame retarding masterbatch is about 0.1% to about 1.5%. In some embodiments, the crosslinking agent is in an amount of about 0.5 wt % to about 1.5 wt %. Specifically, the weight percent of the crosslinking agent of the total composition may be about 0.1, 0.2, 0.3, 0.4, 0.5, 0.6, 0.7, 0.8, 0.9, 1.0, 1.1, 1.2, 1.3, 1.4, or 1.5%.

The addition of the crosslinking initiator in the composition may facilitate the crosslinking reaction. The weight percent of the crosslinking agent of the composition for preparing a non-dripping flame retarding masterbatch is about 0.01% to about 2%; more specifically, about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, and 2%.

The choice of the crosslinking initiator often depends on the crosslinking agent to be used. Illustrative examples of crosslinking initiators include, but are not limited to, potassium persulfate, azobisisobutyronitrile, and benzyl dimethyl ketal (BDK).

The dispersing agent may assist in uniform distribution of the constituents within the composition. Generally, the dispersing agent may be $C_{15-38}$ alkanes, $C_{15-38}$ esters, $C_{15-38}$ organic acids, and mixtures thereof. In the examples presented hereinafter, the dispersing agent used is paraffin.

According to various embodiments of the present invention, the weight percent of the dispersing agent of the composition for preparing a non-dripping flame retarding masterbatch is about 0.1% to about 1.5%. Specifically, the weight percent of the dispersing agent of the total composition may be about 0.1, 0.2, 0.3, 0.4, 0.5, 0.6, 0.7, 0.8, 0.9, 1, 1.1, 1.2, 1.3, 1.4, or 1.5%.

Any synthetic thermoplastic polymer may be used according to the embodiments of the present invention; particularly those suitable for spinning process. Examples of the thermoplastic polymer may include, but are not limited to, polyester, polyamide, polypropylene (PP) and polyvinyl chloride (PVC).

Specifically, illustrative examples of polyester may include polyethylene terephthalate (PET), polybutylene terephthalate (PBT), and polytrimethylene terephthalate (PTT). Polyamide is a synthetic polymer family including, but not limited to, nylon 6, nylon 6.6 and nylon 6.10.

The weight percent of the thermoplastic polymer of the total composition is about 76.5% to about 99.5%. In some embodiments, the thermoplastic polymer is in an amount of about 79-94 wt %. Specifically, the weight percent of the thermoplastic polymer of the total composition may be about 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, or 99.5%.

In another aspect, the present disclosure is directed to a method for preparing a non-dripping flame retarding masterbatch using the composition provided in the above-mentioned aspect/embodiments.

According to one embodiment of the present disclosure, the method comprises the steps as follows. First, about 0.1 to about 15.0 wt % flame retardant, about 0.1 to about 1.5 wt % crosslinking agent, about 76.5 to about 99.5 wt % thermoplastic polymer, and about 0.1 to about 5.0 wt % dispersing agent are admixed to form an admixture. Thereafter, about 0.01 to about 2.0 wt % crosslinking initiator was added into the admixture to form a composition for compounding. The composition is compounded to melt the thermoplastic polymer whereby the melted thermoplastic polymer is crosslinked by the crosslinking agent, and the retarding agent is dispersed in the cross-linked thermoplastic. Generally, the compounding step is performed for about 1-20 minutes, and a compounding temperature is about 220-270° C. Afterwards, the cross-linked thermoplastic having the retarding agent dispersed therein is pelletized to obtain the non-dripping flame retarding masterbatch.

The compounding and pelletizing steps are carried out in the extruder. Any customary extruders and extrusion techniques for preparing masterbatches may be employed according to the embodiments of the present invention. A well-known compounding apparatus may include, but is not limited to, a twin screw extruder. During the operation of the twin screw extruder, the process parameters may be adjusted depending on the actual situation. For example, in one optional embodiment, the speed of the screw member may be adjusted to about 250-350 rpm.

In some embodiments, the mixing steps may be carried out in any suitable container or mixer. Thereafter, the composition is fed into an extruder for compounding and/or pelletizing the masterbatch. Alternatively, the mixing steps may be done in the extruder.

In one optional embodiment, the pelletized non-dripping flame retarding masterbatch may be treated by a UV curing process. The UV curing process may further improve the thermal resistance and non-dripping efficacy of the non-dripping flame retarding masterbatch and/or the final product.

Some working examples according to embodiments of the present invention are provided hereinafter. Compositions used in each working examples (Examples A2-A3, B2-B3, E2-E3) and comparative examples (Examples A1, B1, C1, D1, E1) and test results thereof are summarized in Table 1 and Table 2. Examples in Table 1 used nylon 6 as the thermoplastic polymer; while examples in Table 2 used polyester as the thermoplastic polymer. Working examples listed in Table 1 and Table 2 comprised paraffin in an amount of about 0.5 wt % as the dispersing agent and BDK in an amount of about 0.05 wt % as the crosslinking initiator. In addition, polyphosphate (as flame retardant) and TAIC (as crosslinking agent) were used in various amounts in the examples. No crosslinking initiator is used in the comparative examples.

Also, some of the non-dripping flame retarding masterbatches were further treated by a UV curing process to improve the thermal resistant and non-dripping properties thereof. Masterbatches of the comparative examples did not treated by the UV curing process, since there was no crosslinking agent present in the composition.

The masterbatches of the examples were further spun into fibers, and the limited oxygen index (LOI) of each fiber was measured.

TABLE 1

|  | Flame retardant (wt %) | Crosslinking agent (wt %) | Nylon 6 (wt %) | LOI without UV curing | LOI with UV curing |
| --- | --- | --- | --- | --- | --- |
| A1 | 5.0 | 0 | 94.5 | 20 | — |
| A2 | 5.0 | 0.6 | 93.85 | 21 | 23 |
| A3 | 5.0 | 1.5 | 92.95 | 21 | 25 |
| B1 | 10.0 | 0 | 89.5 | 24 | — |
| B2 | 10.0 | 0.6 | 88.85 | 25 | 28 |
| B3 | 10.0 | 1.5 | 87.95 | 26 | 31 |
| C1 | 15.0 | 0 | 84.5 | 28 | — |
| C2 | 15.0 | 0.6 | 83.85 | 26 | 30 |
| C3 | 15.0 | 1.5 | 82.95 | 27 | 33 |
| D1 | 30 | 0 | 79.45 | 32 | — |

TABLE 2

| | Flame retardant (wt %) | Crosslinking agent (wt %) | Polyester (wt %) | LOI without UV curing | LOI with UV curing |
|---|---|---|---|---|---|
| E1 | 15 | 0 | 84.5 | 23 | 22 |
| E2 | 15 | 0.5 | 83.95 | 24 | 25 |
| E3 | 15 | 1.5 | 82.95 | 26 | 28 |

Take working example B3 as an example, the method for preparing the non-dripping flame retarding masterbatch comprises the steps as follows. First, about 10.0 wt % polyphosphate, about 1.5 wt % TAIC, about 87.95 wt % nylon 6, and about 0.5 wt % dispersing agent were admixed to form an admixture. Then, to the admixture was added BDK in an amount of about 0.05 wt % to form a composition. The composition was compounded for about 20 minutes at a compounding temperature of about 220-270° C. During the compounding step, the nylon 6 was melted by heat and crosslinked under the action of TAIC, while the polyphosphate evenly dispersed within the crosslinked nylon 6 molecules. After the compounding step, the compounded product was pelletized so as to produce the non-dripping flame retarding masterbatch of working example B3. Masterbatches of other working examples and comparative examples are prepared by similar process except the composition and/or weight ratio of the constituents were modified as specified in Table 1 and Table 2.

The masterbatch was dried at about 85° C. in a baking oven. In the case where the masterbatch was treated by the UV curing process, the dried masterbatch was irradiated by a UV lamp for about 1-60 minutes.

The dried masterbatch, with or without UV curing treatment, was spun into fiber, and the LOI value of the fiber was measured in accordance with the procedure set forth in ASTM standard D2863-00. LOI is used to represent the relative flammability of plastics and other materials. In brief, the principle of the LOI test is to measure the minimum concentration of oxygen (i.e., LOI) that will just support flaming combustion of a material in a controlled oxygen/nitrogen mixture environment. Generally, higher LOI value represents better flame retarding efficacy. In the related field, a material with an LOI≧20 is classified as flame retarding. However, in actual application, a flame retarding fiber must have an LOI≧26 (nonflammable grade) so as to exhibit acceptable fire retarding efficacy. A fiber with an LOI of 26 would start burning upon contacting with the flame, but the burning may go out as soon as the fiber leaves the flame and the fiber may get carbonized during the burning.

As can be observed from the data shown in Table 1 and Table 2, while the amount of the flame retardant was kept constant, the addition of a substantially small amount (0.5 wt % of the total composition) of crosslinking agent is sufficient to increase the LOI value of the fiber.

Examples listed in Table 1 used polyamide (nylon 6) as the thermoplastic polymer. Take comparative example A1 and working example A2 for example, the addition of about 0.6 wt % crosslinking agent may increase the LOI value (without curing) from 20 to 21. Similar results may also be observed in other examples, such as comparative example B1 comparing to working example B2 and comparative example C1 comparing to working example C2.

Moreover, as the amount of the crosslinking agent increases, the LOI value of the fiber also increases correspondingly. For example, in the working example C2, the amount of the crosslinking agent thereof is about 6 wt %, and the LOI value (without UV curing) thereof is 26, while in the working example C3, the amount of the crosslinking agent thereof is about 1.5 wt %, and the LOI value (without UV curing) thereof is 27.

Examples listed in Table 2 used polyester as the thermoplastic polymer. By comparing the comparative example E1 to the working example E2, it is observed that the addition of a small amount (0.5 wt % of the total composition) may increase the LOI value (without UV curing) from 23 to 24.

Furthermore, as can be seen from Table 1 and Table 2, the non-dripping flame retarding masterbatch of the present disclosure, though comprising less amount of flame retardant (about 0.1-15 wt %) comparing to the commercial products (comprising flame retardant of 20-30 wt %), exhibits satisfactory flame retarding efficacy, especially those being treated by the UV curing process.

More specifically, in working examples B2, B3, C2, and C3, only 10 wt % or 15 wt % were used; nevertheless, the LOI values of these working examples with UV curing process are respectively 28, 31, 30, and 33, all which are qualified as the nonflammable grade (LOI≧26). Similarly, working example E3 comprised about 15 wt % flame retardant, and its LOI with and without UV curing treatment are 28 and 26, respectively. Thus, the E3 fiber is also nonflammable.

Moreover, comparative example D1 comprised about 30 wt % flame retarding which is much higher than that of working example C3 (with 15 wt % flame retardant); however, the LOI value of comparative example D1 (32) is lower than that of the UV-cured working example C3 (33).

Currently, there is no widely accepted standard for testing the dripping property of the fibers and textiles. In the present disclosure, UL 94 vertical combustion test, which is directed to the combustion behaviors of engineering plastics, was carried out to observe the dripping property of the sample.

The test results show that the chips made of the non-dripping flame retarding masterbatch of the present disclosure may qualify as the V1 level to V0 level (non-dripping during combustion).

FIG. 1A and FIG. 1B are photos illustrating the after-burnt appearance of a pure nylon chip (FIG. 1A) and the chip of working example B3 (FIG. 1B). In FIG. 1A, significant dripping can be observed (the dropping on the surface of the chip is the dripping). In comparison, a char (carbonized layer) was formed on the surface of the chip of working example B3 (FIG. 1B) whereby preventing the formation of the dripping.

Similar results were obtained regarding polyester materials. After-burnt appearances of a pure polyester chip and a chip of working example E3 are presented in FIG. 2A and FIG. 2B, respectively. In FIG. 2A, significant dripping can be observed. In comparison, a char was formed on the surface of the chip of working example E3 (FIG. 2B) whereby preventing the formation of the dripping.

In yet another aspect, the present disclosure is directed to a non-dripping flame retarding material. In various embodiments, the flame retarding material can be manufactured in a form of a masterbatch, a fiber, a filament, a yarn, a textile, a film, a sheet, or a chip.

According to embodiments of the present disclosure, the non-dripping flame retarding material comprises a crosslinked thermoplastic polymer and a fire retardant dispersed within the crosslinked thermoplastic polymer, wherein the weight ratio of the crosslinked thermoplastic polymer to the fire retardant is about 5:1 to 996:1. In this regard, the weight of crosslinked thermoplastic polymer is the sum of the amount of the crosslinking agent and the amount of the thermoplastic polymer used in the composition for making this non-dripping flame retarding material.

In some optional embodiments, the weight ratio of the crosslinked thermoplastic polymer to the fire retardant is about 5.5:1 to 19:1. Specifically, the weight ratio may be 5.5:1, 6:1, 7:1, 8:1, 9:1, 10:1, 11:1, 12:1, 13:1, 14:1, 15:1, 16:1, 17:1, 18:1 or 19:1. For example, according to the above-mentioned working examples E2 and E3, the sum of the weight percents of the crosslinking agent and the thermoplastic polymer is about 84.45%, while the weight percent of the fire retardant is about 15%; therefore, the weight ratio of the crosslinked thermoplastic polymer to the fire retardant is about 5.63:1 (~5.5:1). According to working examples A2 and A3, the weight ratio of the crosslinked thermoplastic polymer (94.45 wt %) to the fire retardant (5 wt %) is about 18.89:1 (~19:1).

According to the principle and spirit of the present disclosure, the non-dripping flame retarding material is at least partially made of/from the non-dripping flame retarding masterbatch disclosed herein. Hence, the constituents making up the composition and weight ratios thereof are disclosed in the above-described embodiments. Accordingly, for the sake of brevity, a description of the composition for preparing the non-dripping flame retarding material is not repeated.

According to the principle and spirit of the present disclosure, the non-dripping flame retarding masterbatch is suitable for use in a spinning process. Moreover, the masterbatch can be spun directly without adding additional pure thermoplastic masterbatch. A simulation analysis was conducted to determine the pressure rise of the present masterbatch so as to evaluate the spinnability of the masterbatch.

The result of the analysis shows that the pressure rise of the E1 masterbatch may increase 5 folds during the spinning process. In this case, the pressure is so high that it may cause damage to the spinning apparatus. Hence, the E1 masterbatch is not suitable for the spinning process.

In comparison, a relatively stable spinning pressure is observed in the simulation analysis of the masterbatch E3. Specifically, the pressure variation of masterbatch E3 during the spinning process is no greater than 5 bars. Hence, the masterbatch according to the present disclosure exhibits satisfactory spinnability.

In addition, Textechno FPAC Strength Tester (Serial No. 35032) was used to determine the mechanical properties of the fibers made from the masterbatches of various working examples.

First, B3 masterbatch was spun into fibers with various linear densities, as shown in Table 3. The fibers were tested according to the protocol provided with the strength tester, and the tenacity and elongation data thus obtained are summarized in Table 3. Generally, fibers with desirable tenacity are suitable for subsequent process for forming the yarns; moreover, such fibers/yarns are suitable to be used in the machine for knitting or plain weaving. Elongation of a fiber is related to the extensibility of the fiber during the spinning process. Usually, a fiber with an elongation rate less than 30% may break during the subsequent process such as draw-spinning.

As shown in Table 3, in working example B3-1, the fiber was spun under a condition where the speeds of the first and third screw are about 500 and 600 rpm, respectively, and thus, an extension ratio of the screws was 1:1.2 (500:600). Still refer to Table 3, the fiber of working example B3-6 was spun under a condition where the speeds of the first and third screw are about 600 and 2100 M/min, and thus an extension ratio of the screws was 1:3.5 (600:2100). Accordingly, the tenacity of the fiber of working example B3-6 (2.09 g/den) is higher than that of the fiber of working example B3-1 (0.81 g/den).

Furthermore, the fiber of working example B3-6 exhibit an elongation greater than 45%, which makes the fiber suitable for draw-spinning.

TABLE 3

| | Screw speed M/min | Fiber Linear Density (den) | Tenacity (g/den) | Elongation (%) |
|---|---|---|---|---|
| B3-1 | 500-600 | 215 | 0.81 | 263.55 |
| B3-2 | 500-700 | 220 | 0.96 | 193.81 |
| B3-3 | 500-1000 | 168.3 | 1.32 | 133.05 |
| B3-4 | 500-1250 | 132.2 | 1.66 | 84.99 |
| B3-5 | 500-1400 | 147.6 | 1.83 | 56.21 |
| B3-6 | 600-2100 | 131.2 | 2.09 | 47.33 |

Further analysis regarding fibers of other working examples shows that when the composition for preparing the masterbatch comprises a about 8 wt % flame retardant, the fiber thus-obtained has a tenacity of about 2.6 g/den, and an elongation of about 6.97%. Moreover, when the amount of the flame retardant is increased to about 12.0 wt %, the tenacity and elongation of the resultant fiber are about 2.1 g/den and about 47.33%, respectively.

In comparison, when the composition for preparing the masterbatch comprises about 20 wt % flame retardant, it is unable to spin the resultant masterbatch because the pressure rise simulation show that the pressure rise during the spinning process is unstable.

The fibers of the working examples were further knitted into fabrics. Photos illustrating appearances of the fabric made of the fibers of working example B3-5 before and after burning are presented in FIG. 4A and FIG. 4B, respectively. As can be seen in FIG. 4B, char was formed on the fabric and no dripping was produced upon burning.

Textiles/fabrics will usually go through dyeing and finishing process. Such process(s) may sometimes jeopardize the functionality of the final product. Hence, washing fastness of the fabrics of the present disclosure was determined according to the procedure set forth in AATCC 61-2008 standard.

The fiber of working example B2 was processed into a plain-woven fabric and dyed with the testing dye. During the dyeing process, the dyeing system was heated from room temperature (about 23-27° C.) to about 100° C. at a rate of about 2° C./min and maintained at about 100° C. for about 30 minutes; then, the dyeing system was cool to about 75° C. at a rate of about 2° C./min and maintained at 75° C. for 15 minutes so that the color can be fixed onto the fabric. Test results showed that the dyed fabric had a washing fastness of at least level 4.5, which is acceptable by the textile field.

Furthermore, the LOI test was conducted to determine the flammability of the dyed fabric. The LOI value of the dyed fabric made from the fiber of working example B2 is 27, which belongs to the nonflammable grade.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A non-dripping flame retarding fiber, comprising:

a crosslinked nylon polymer, comprising about 76.5 wt % to about 99.5 wt % of a nylon polymer based on the total weight of the non-dripping flame retarding fiber, and about 0.1 wt % to about 1.5 wt % of a crosslinking agent based on the total weight of the non-dripping flame retarding fiber, wherein the crosslinking agent is a diallyl compound or a triallyl compound; and a fire retardant dispersed within the crosslinked nylon polymer, wherein the fire retardant is present in the non-dripping flame retarding fiber in an amount of about 0.1 wt % to about 15 wt %, wherein the crosslinked nylon polymer having the fire retardant dispersed therein is formed by compounding, and the non-dripping flame retarding fiber is drawn from the crosslinked nylon polymer having the fire retardant dispersed therein and has an elongation of at least 45%.

2. The non-dripping flame retarding fiber of claim 1, wherein the diallyl compound is diallyl phthalate, diallyl succinate, or N,N'-diallyltartramide.

3. The non-dripping flame retarding fiber of claim 1, wherein the triallyl compound is triacryloylhexahydro-1,3,5-triazine, triallylamine, triallyl trimesate, triallyl cyanurate, triallyl isocyanurate, or triallyl-ammoniumcyanurate.

4. The non-dripping flame retarding fiber of claim 1, wherein the nylon polymer is nylon 6, nylon 6.6, or nylon 6.10.

5. The non-dripping flame retarding fiber of claim 1, wherein the flame retardant has a diameter of about 1-10 μm.

6. The non-dripping flame retarding fiber of claim 1, wherein the flame retardant is a halogen-free flame retardant or a phosphorus-containing flame retardant.

7. The non-dripping flame retarding fiber of claim 6, wherein the phosphorus-containing flame retardant is polyphosphate or ammonium polyphosphate.

* * * * *